Figure 1:
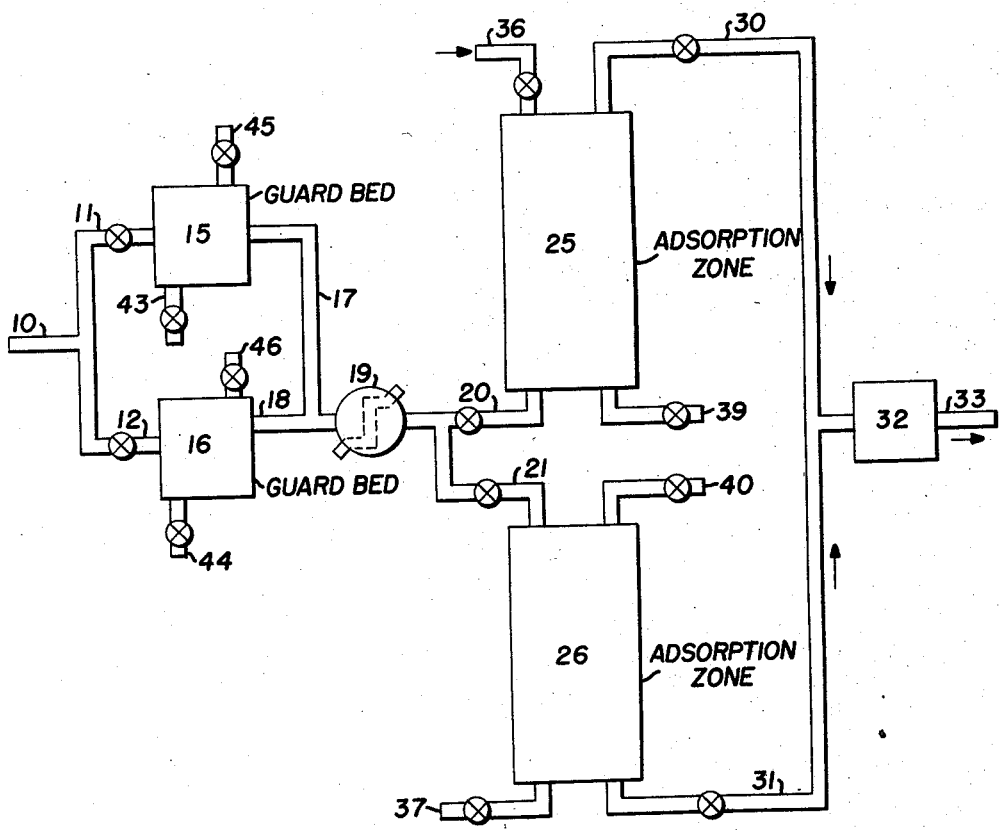

United States Patent Office 2,899,474
Patented Aug. 11, 1959

2,899,474

FEED PRETREAT IN HYDROCARBON ADSORPTION PROCESS

Harold A. Ricards, Westfield, N.J., assignor to Esso Research and Engineering Company, a corporation of Delaware Application May 2, 1957, Serial No. 656,710

5 Claims. (Cl. 260—676)

This invention relates to a process for the selective removal of hydrocarbons from mixtures by the use of adsorbents. The invention is particularly directed to an adsorption process employing what are known as molecular sieves. The invention is especially concerned with the use of guard beds to improve the overall efficiency of operation in the separation of hydrocarbons when using processes employing adsorbents of the molecular sieve type.

It is known that certain natural zeolites, including analcite and chabazite, have the property of preferentially adsorbing certain types of hydrocarbons from mixtures thereof with other hydrocarbons, thus enabling the separation, for example, of normal paraffinic hydrocarbons from branch chain paraffinic hydrocarbons and/or cyclic and aromatic hydrocarbons.

Zeolites differ from each other in chemical composition but they may be generally characterized as alkali metal or alkaline earth metal hydrated alumino-silicates. Analcite has the empirical formula $NaAlSi_2O_6.H_2O$ while that of chabazite is $CaAl_2Si_4O_{12}.6H_2O$.

The crystal patterns of these zeolites are such that they present structures containing a large number of pores having an exceptional uniformity of size. Only molecules that are small enough to enter the pores can be adsorbed. The pores in different zeolites may vary in diameter from less than 4 to 15 or more Angstrom units, but for any one zeolite the pores are substantially of uniform size. Because of these properties, such zeolites are known as molecular sieves. Certain synthetic zeolites also have molecular sieve properties as taught, for example, by Barrer in U.S. Patent 2,306,610 and by Black in U.S. Patents 2,442,191 and 2,522,426.

Methods for separating the various types of hydrocarbons such as aliphatics from aromatics, straight chain from branched chain hydrocarbons and so on, from mixtures of hydrocarbons, have assumed increased importance in industry with the realization that specific structures contribute particular properties which are directly related to the uses that are made of the particular hydrocarbons. Thus, for example, it is known in the petroleum industry that in the preparation of motor fuels the presence of normal paraffinic hydrocarbons leads to low octane ratings for the fuels, whereas branched chain paraffinic hydrocarbons and aromatic hydrocarbons contribute to high octane ratings. Thus it is important to be able to remove normal paraffins from light naphthas and thereby upgrade the octane rating of the remaining naphthas. The normal paraffins thus removed may be subjected to reforming or isomerization processes to convert them to different hydrocarbon structures of higher octane rating for blending into gasoline.

One of the particularly attractive methods for removing normal paraffinic hydrocarbons from a light naphtha is to contact the naphtha with molecular sieves having a pore diameter of 5 A., for example. During the contact or adsorption step the normal paraffins enter the pores of the sieve structure and are adsorbed or occluded within the cavities of the sieve structure. The amount of hydrocarbon adsorbed is related to the adsorption conditions such as temperature and partial pressure of the normal paraffins in the mixture. Also of practical importance in a commercial process are conditions of contact of the hydrocarbon with the sieve. Adsorption rate limitations must be taken into consideration in order to maximize the utilization of the sieve and to attain reasonably approximate equilibrium adsorptive capacity. Normally, in a commercial type operation the sieve containing the adsorbed material would be desorbed in a second and separate step. This permits reuse of the sieve for further adsorptive type separation over and over again. Desorption can be accomplished by a number of methods such as increasing temperature and lowering pressure or by the use of displacing type agents which can enter the sieve and be adsorbed themselves (or act as a purge).

Although excellent and selective separation of normal paraffins from a naphtha can be realized by a process employing 5 A. molecular sieves, one of the limiting factors is that the adsorptive capacity of the molecular sieve decreases after a number of adsorption and desorption cycles such as described above. The loss of sieve capacity is considered to involve two factors, one of them being a decrease in the saturation capacity of the sieve, and the other that the rate of adsorption decreases so that for the same feed rate the sieve is less fully saturated at the time that breakthrough occurs. "Breakthrough" is defined as the point in the adsorption cycle where the material being adsorbed first appears in the effluent material, which up to this point has contained only molecules which cannot be adsorbed on the sieve.

Pilot plant studies have shown that the loss of adsorptive capacity as the molecular sieve ages in a cyclic operation can be a major limitation. For example, loss rates as high as 28 percent of original capacity have been observed for each 100 w./w. of a light virgin naphtha passed over a sieve bed.

Studies have not clearly defined the mechanism of the sieve deactivation. It has been established that trace components in feed stocks are in part responsible for deactivation. In addition, process operating variables such as pressure, temperature, cycles, etc. undoubtedly contribute to this phenomenon. It is reasonable to assume that there are interaction effects between feed and process variables.

It is a principal object of the present invention to provide an improved method of operating a molecular sieve process that will prolong the effective sieve capacity.

In accordance with the present invention, the effective adsorptive life of a bed of molecular sieve is extended by contacting the feed stream with a guard bed of the same type of sieve that is employed in the main contacting bed but that is operated at a much lower temperature than the principal bed of adsorbent. Also, by periodically regenerating the guard bed, it is possible to almost completely prevent deactivation of the molecular sieve in the principal bed.

The type of operation employed in the present invention is substantially different from the use of guard chambers in catalytic processes that operate at substantially the same conditions as the main bed of catalyst. The present invention is based on the discovery that use of a molecular sieve (of identical pore or "hole" diameter to that used in the main bed) at low temperatures as a guard bed permits effective removal of the deleterious trace components from the feed. The guard should be maintained at lowest practical temperatures (e.g. ambient) to ensure maximum removal of the deleterious trace components from the feed by selective physical adsorption. It is believed that the trace materials removed are more polar in nature than the main feed stream and are thus selectively adsorbed on the guard sieve at high capacity and fast rate even though present in very small amounts.

If these deleterious materials enter the main sieve bed they undergo undesired reactions. It is believed that these reactions are catalyzed by the sieve at higher temperature. The reactions probably not only involve the trace components, but also gross components in the feed or in a displacement medium if such is used for desorption. The reactions are probably of a polymerization type and if the temperature is high enough (such as during the desorption part of a cycle) coking type reactions may occur. The products from these reactions can include greater numbers of molecules than the so-called deleterious polar components in the feed. This can cause severe deposition on the sieve material and thus lower effective cycle capacity of the sieve process.

In the case of the low temperature guard sieve used in the present invention, the small amounts of undesired compounds are removed by adsorption rather than by reaction. In this manner, less sieve is used to remove these materials than would be needed if the guard chamber of sieve were part of the main sieve bed or a separate chamber or vessel at main sieve bed operating conditions.

It has been found that use of such a guard almost completely prevents the deactivation of the main sieve bed, even when the bed is subjected to operaing temperatures as high as 700° F. Further, it has been found that the adsorbed contaminant or deleterious material which accumulates gradually on the low temperature guard can easily be removed as required. In this way, periodic regeneration of the guard is effective in maintaining cycle capacity of the principal bed or beds of molecular sieve used in the cyclic adsorption-desorption process for desired hydrocarbon separations.

Figure 2:
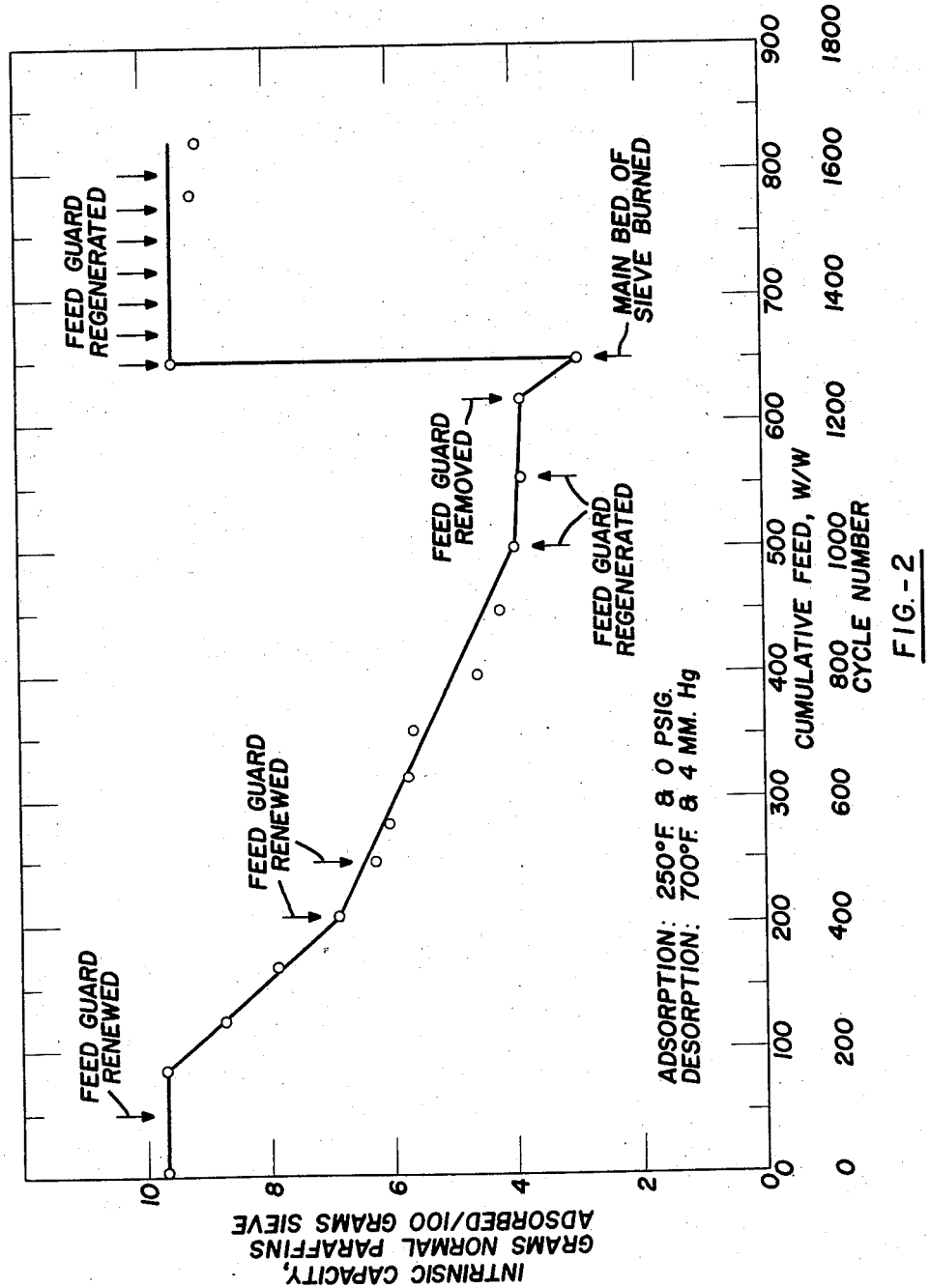

The nature and objects of the invention will be more readily understood when reference is made to the accompanying drawing, in which Figure 1 is a schematic flow plan of a process suitable for conducting the present invention, and Figure 2 is a graph showing the effect of a guard bed on the adsorptive capacity of a principal bed of molecular sieve.

Referring now to Figure 1, a pair of adsorption columns 25 and 26 are provided, each containing a bed of molecular sieve adsorbent. The pore diameter of the molecular sieve will depend upon the molecular size of the material to be separated. In general when it is desired to increase the octane rating of a naphtha or of a hydrocarbon stream boiling in the gasoline range by removing normal paraffins therefrom, molecular sieves having a pore diameter of 5 A. are satisfactory. When other types of hydrocarbons, as for example aromatics, are to be removed from a feed stream, molecular sieves of larger pore diameter, as for example 13 A. will be employed. Two adsorption columns are used so that one column can handle the adsorption step, while the other column is being desorbed.

In accordance with the present invention the feed stream entering through line 10 is first sent by means of line 11 or line 12 through a guard bed of molecular sieve positioned in either guard zones 15 or 16. Here again two zones are provided so that one zone can be handling the feed while the molecular sieve in the other guard zone is being regenerated. The guard sieve in zones 15 and 16 is identical to the molecular sieve used in the principal beds shown as zones 25 and 26. The feed and the guard chambers shown as zones 15 and 16 are maintained at ambient temperature, preferably not above 100–150° F. This maximizes effectiveness of the guard action and makes requirements for regeneration of guard infrequent. In the case of most light naphtha ($C_5+$) and heavier feeds, contact in the guard chambers will be liquid phase.

The feed stream thus pretreated in one of the guard zones passes through line 17 or line 18 into a heat exchanger 19 to raise it to the desired temperature for the adsorption step. In most instances with naphthas it is desired to raise the temperature in exchanger 19 so that the total feed mixture is vaporized as it passes on to the adsorption separation step. Vapor phase operation maximizes adsorption rate and permits operation at high space velocities. In addition it permits high overall separation efficiency since the outside surfaces of the sieve particles, and the spaces between, will not be wet with liquid that will have to be displaced from the unit at the end of an adsorption cycle and thereby cause loss of product or requiring feed recycle.

The heated (and in most instances vaporized) feed then passes through line 20 or line 21 into adsorption column 25 or 26 where removal of normal paraffins takes place. The stream of upgraded octane number, from which normal paraffins have been removed, passes through line 30 or 31 into a cooler 32 and then through line 33 for further handling. This adsorption part of the cycle is maintained until initial breakthrough of normal paraffins occurs, or until some predetermined quantity of the latter pass through the sieve unadsorbed, at which time the adsorption cycle is terminated in one of the adsorption columns and immediately feed is switched into the alternate adsorption column which has just been desorbed and hence prepared for the adsorption step. The need for desorption of the sieve in either of the adsorption towers can be determined by checking the effluent from the adsorption column by conventional means such as refractive index or by spectrographic analyses. If the feed to the process is of an essentially constant composition, desorption may be on a fixed period basis, the cycle time being set by previous experience with the same feed.

When it is desired to desorb normal paraffins from the molecular sieve in the bed of either column 25 or column 26, the feed entering that column is cut off and desorption is started. Various methods of desorption can be employed. One of these is use of a suitable desorbent sent into the column through line 36 or line 37. The mixture of desorbent and desorbed hydrocarbons leaves the column through line 39 or line 40. When desorption is accomplished by displacement of the adsorbed hydrocarbons, use of an olefin-containing gas is recommended, preferably one comprising a substantial proportion of propylene. Cracked refinery gases containing major proportions of propylene and minor amounts of ethane, propane and butylene may be used for this purpose. The desorbate can be separated from the desorbent by partial condensation, fractionation, or other separation techniques, depending on the choice of desorbent and character of the desorbate. Means for doing this are not shown. Normally, the desorbate has good product value and is recovered. If costly desorbents are employed these would normally be recovered and reused for desorbing in the process.

In a simpler process, desorption of sieve beds 25 and 26 is accomplished by more conventional means, namely increasing temperature of the beds and reducing pressure. Pressure (or partial pressure) of adsorbed material can be reduced by pulling a vacuum on the sieve beds 25 and 26 through lines 39 and 40, respectively. An alternative method of reducing partial pressure of the adsorbed material within these zones is by the use of an inert purge, such as nitrogen, flue gas (oxygen free), or the like, introduced through lines 36 and 37. This has an added advantage in that the sieve beds can be heated by being contacted with hot purge gas, thus serving the dual purpose of providing heat and lowering pressure. In similar fashion, cool purge gas can be used to cool the sieve beds back to the desired temperature for the adsorption step.

When it becomes necessary to regenerate the molecular sieve bed in the guard zone 15 or 16, feed to that bed is cut off and the feed is conducted through the other guard bed. Regeneration of the guard bed can be accomplished by heating the bed and applying vacuum, as for example by means of lines 43 or 44. Alternatively, the bed may be regenerated by burning with an oxygen containing gas at temperatures below 1000° F. In still another alternative, the bed may be heated and partial pressure of the adsorbed contaminant reduced by purging the guard beds with a hot inert gas such as nitrogen. Hot purge can be introduced into lines 43 or 44 and a mixture of purge and desorbed contaminant removed from lines 45 or 46, as applied to zones 15 and 16, respectively.

In a practical application of the invention, a light virgin naphtha of a $C_6$ to 200° F. boiling range may be conducted through the system. The guard bed should be maintained at a temperature no higher than 100 to 150° F. and preferably at ambient temperatures (50–90° F.) and the feed rate should be reasonably low, as for example less than 4 w./w./hr. and preferably less than 1 w./w./hr. After the feed has passed through the guard bed, feed temperature may be raised to 250 to 300° F. to vaporize the feed for the adsorptive removal of the normal paraffins in a bed of 5 A. molecular sieve. Identical pressures are preferred for the guard bed treatment and for the adsorption step.

The effectiveness of this invention is shown in the following examples:

*Example 1*

A light virgin naphtha of the $C_6$ to 200° F. boiling range containing aromatic and branched chain hydrocarbons and about 20 to 25 percent of normal paraffin hydrocarbons was passed through a system of the type shown in Figure 1, employing a guard bed and a main adsorption bed, over a considerable number of adsorption and desorption cycles. Both beds employed a commercially available synthetic zeolite molecular sieve of 5 A. pore size in the form of extruded 1/16" diameter pellets. The weight of sieve in the guard bed was 66 percent of weight of sieve in the main bed. The temperature of the guard bed was maintained at 70–90° F. Adsorption in the main bed of the sieve was conducted at about 250° F. under 1 atmosphere of pressure, while desorption was conducted at about 700° F. under 4 mm. of pressure. The cycle comprised 55 minutes of adsorption time at a feed rate of 0.5 w./w./hr., followed by a break period of 5 minutes and a desorption period of 85 minutes, and another break period of 5 minutes and a cooling period of 25 minutes, before adsorption was resumed. In order to save time in making the runs, adsorption was started as soon as the temperature of the bed had reached about 450° F., but the nominal adsorption temperature of 250° F. was attained quite rapidly. When it was desired to determine the "intrinsic" capacity (i.e. capacity under standard conditions) of the sieve bed, adsorption measurements were made with the sieve bed maintained at the exact temperature of 250° F.

Thus each cycle consumed three hours of time. Cooling of the bed to adsorption temperature was accomplished by a nitrogen purge at the rate of 650 v./v./hr. After a certain number of cycles, the sieve material in the guard bed was replaced with either fresh sieve or else the sieve in the guard chamber was regenerated. The intrinsic capacity of the main sieve bed was determined at the end of selected cycles. The results are shown in Figure 2. The data obtained show that the guard bed will almost completely prevent sieve deactivation if the condition of the guard is kept effective by replacement or regeneration.

In Figure 2 the capacity of the main bed of sieve is shown plotted against number of cycles (adsorption-desorption) and as a function of cumulative feed passed over the main bed of sieve. The main bed of sieve contained 1200 grams of 5 A. sieve and was guarded by a chamber containing 800 grams of 5 A. sieve. Conditions have been described previously. The operation was started using fresh 5 A. guard sieve which was renewed after cycle 90 (67 w./w. of feed through the guard). Up to this point the capacity of the sieve for normal paraffins was about 9.7 grams/100 grams of sieve and was constant. The guard sieve was replaced at cycle 90. The capacity of the main sieve bed remained constant until cycle 170. At this point 60 w./w. of feed had passed through the second charge of guard sieve. Apparently there was breakthrough of deleterious material which passed over into the main sieve bed and caused immediate deactivation of the main bed. Cycle capacity dropped between cycles 170 and 420 at a rate of 22 percent per 100 w./w. of feed passed through the main sieve bed. Of course, this rate loss is specific to this particular naphtha feed stock. Greater or lesser capacity loss rates are possible depending on feed. In the light of later data shown on Figure 2, it is evident that the loss rate experienced between cycles 170 and 420 is typical of what would be expected in this sieve process if no guard sieve were employed.

A fresh guard bed was then installed at cycle 420 and renewed again at cycle 500. The "fresh" guard beds did not completely arrest the loss in intrinsic capacity, but the rate of capacity loss was significantly reduced from 22 percent to 10 percent per 100 w./w. between cycles 420 and 1000. It is believed that the reason that the guard beds installed at cycle 420 was not as effective as the guard beds installed at 0 and 90 cycles, is that the later guard bed material had been stored under humid conditions and had not been dried before use. Water has a "poisoning" action on the adsorption rate of molecular sieves, hence not all of the deleterious material could be adsorbed by the guard. This is substantiated by the data obtained in cycles 1000 to 1240 wherein the guard bed used was the partially effective guard bed which had been regenerated. Regeneration was effected by pulling a vacuum down to 4 mm. Hg pressure while heating the guard to 800° F. Water as well as adsorbed hydrocarbon type material was driven off. The dry and active guard was then returned to service at cycle 1000 and was regenerated by the same procedure at cycle 1110. The guard was completely effective once again in protecting the main bed of sieve, which varied in temperature between 250° F. and 700° F. as pretreated (by the 5 A. guard) feed was alternately adsorbed and desorbed. The sieve capacity held level at 4 grams of normal paraffins removed per 100 grams of sieve from cycle 1000 to cycle 1240.

At cycle 1250 the guard bed of room temperature 5 A. sieve was removed from the system, and between cycles 1250 and 1300 no guard bed was employed. During this period the intrinsic capacity of the principal bed of sieve dropped off quite rapidly at the rate of 28 percent per 100 w./w. This is a very sharp rate of decline and could not be tolerated economically in a commercial process. After 60 cycles at this high loss rate the intrinsic capacity of the sieve had fallen to a value of less than 3 grams/100 grams of sieve from an initial value of 9.7 grams for fresh sieve. All of the capacity loss occurred during periods when either no 5 A. guard or an ineffective guard was present.

At cycle 1300 the main bed of sieve was regenerated by burning with an inert gas containing 1.5 volume percent oxygen. Maximum temperatures were under 1000° F. The capacity, selectivity, and adsorption rate of the sieve were restored.

Three hundred and fifty additional cycles were run (1300–1650) after this, during which period the feed was passed through a 5 A. guard chamber at room temperature. The guard was regenerated easily about every 50 cycles by heating to 800° F. and lowering pressure to about 4 mm. Hg. The guard was completely effective in treating the feed and no measurable capacity loss was observed in the main sieve bed.

*Example 2*

In place of a guard bed of 5 A. molecular sieve, a bed of 4 A. synthetic zeolite molecular sieve was employed, on the supposition that traces of water and other small molecules of a polar type could be removed from the feed by such a bed. The guard bed was operated at room temperature while the principal sieve bed varied in temperature between 250°–300° F. for the adsorption step and 250–700° F. for the desorption step. In one portion of the study, desorption was obtained by raising the temperature and applying vacuum (4 mm.). In a second portion of the study nitrogen purging and increased temperatures were employed for desorption, and in a third portion of the study desorption was accomplished by maintaining the temperature at 250° F. and displacing adsorbed normal paraffins with either propylene or butylene. Periodically during the test the intrinsic capacity of the sieve was measured under standard conditions (250° F. adsorption following desorption at 4 mm. vacuum and 700° F.). Capacity loss of the main bed of sieve was essentially constant over the entire test, not varying greatly with the different operating conditions employed. This loss rate was about 25 percent per 100 w./w. feed. It is thus seen that the guard bed of 4 A. sieve was not as effective as the guard bed of the 5 A. sieve employed in Example 1, wherein it was established that a properly prepared guard bed of 5 A. sieve will give essentially complete protection to the principal bed of sieve.

The above examples were obtained when employing molecular sieves of 5 A. pore size for the adsorptive removal of normal paraffins from a naphtha. The same principles will also apply when using beds of sieve of greater pore size, as for example, when employing 13 A. molecular sieve for the adsorption of aromatic hydrocarbons. In this case a guard bed of 13 A. sieve would be employed at low temperature. The efficiency of a 13 A. molecular sieve guard bed would not be expected to be as great as that of a system employing a 5 A. guard bed for a 5 A. main sieve bed but it would nevertheless act to maintain the efficiency of a principal bed of sieve.

Although in the tests described, the proportion of sieve volume in the guard bed to sieve volume in the principal bed was 0.66 to 1, there is nothing critical in the size of the guard bed with relation to the size of the principal bed. If the size of the guard bed is relatively small compared to that of the main bed, it is simply necessary to regenerate the guard bed more often. In general the guard bed is used until an abrupt drop in capacity loss of the principal bed under standard operating conditions is observed when the stream is switched to a fresh guard bed and the spent guard bed is regenerated.

The effectiveness of the guard action at low temperature as compared to adding the quantity of guard sieve to the main sieve bed can be seen by the data shown in Figure 2. The curve traced on Figure 2 (intrinsic capacity of the molecular sieve) is composed of a series of points obtained by desorbing the sieve on each cycle at 700° F.. and 4 mm. Hg absolute pressure. It will be recalled that these are the same desorption conditions at which the guard sieve was regenerated. During periods where either no guard or an ineffective guard was used (cycles 170–1000 and cycles 1240–1300), i.e. where there was not proper pretreatment of the feed, this potent desorption or regeneration technique was constantly less effective. Reaction occurred unless a guard sieve was employed and reactant material removed before the feed was subjected to high temperatures (above 200° F.) in the main sieve bed. If the guard sieve were made part of the main sieve bed, it would be at reaction conditions and lose capacity at the same rate as other sieve particles in the main sieve bed when expressed on a w./w. basis (weight of feed/weight of 5 A. sieve).

It is desirable for maximum effectiveness of the guard bed that the feed be well dried before it enters that bed since the guard bed will also remove water from the feed, and to the extent that it does so its efficiency for removing deleterious material from the feed will be impaired. Thus the feed can be passed through a bed of a suitable drying agent such as silica gel or barium oxide, for example, before it enters the guard bed.

Although in the specific examples given the adsorption temperatures were in the range of 250–300° F. a wider range of temperatures, i.e. from 200° to 400° F. is contemplated for the adsorption zone.

It is not intended that the scope of this invention be limited in any manner by the specific examples described herein. The scope of the invention is limited only by the claims appended hereto.

What is claimed is:

1. In a process for the separation of hydrocarbons of a selected type from mixtures thereof with hydrocarbons of other types wherein said mixtures are contacted with a zeolitic molecular sieve adsorbent of a selected pore size in an adsorption zone and adsorbed hydrocarbons are periodically desorbed from said adsorbent in a cyclic manner, the improvement which comprises contacting said mixtures with a zeolitic molecular sieve adsorbent of the same pore size as the adsorbent in said adsorption zone, in a pretreatment zone prior to said adsorption zone, the temperature in said pretreatment zone being considerably below the temperature in said adsorption zone.

2. Process as defined by claim 1 in which the temperature in said adsorption zone is in the range of 200°–400° F. and the temperature in said pretreatment zone is no greater than 150° F.

3. Process as defined by claim 1 wherein the temperature in said pretreatment zone is in the range of 50° to 90° F.

4. Process as defined by claim 1 wherein said molecular sieves have a pore size of 5 A. and said hydrocarbons of a selected type comprise normal paraffin hydrocarbons.

5. Process as defined by claim 1 including the step of regenerating the molecular sieve in said pretreatment zone by removing therefrom adsorbed deleterious materials and re-using said regenerated molecular sieve in said pretreatment zone.

References Cited in the file of this patent

UNITED STATES PATENTS

| | | |
|---|---|---|
| 2,628,933 | Eagle et al. | Feb. 17, 1953 |
| 2,818,449 | Christensen et al. | Dec. 31, 1957 |
| 2,818,455 | Ballard et al. | Dec. 31, 1957 |